UNITED STATES PATENT OFFICE.

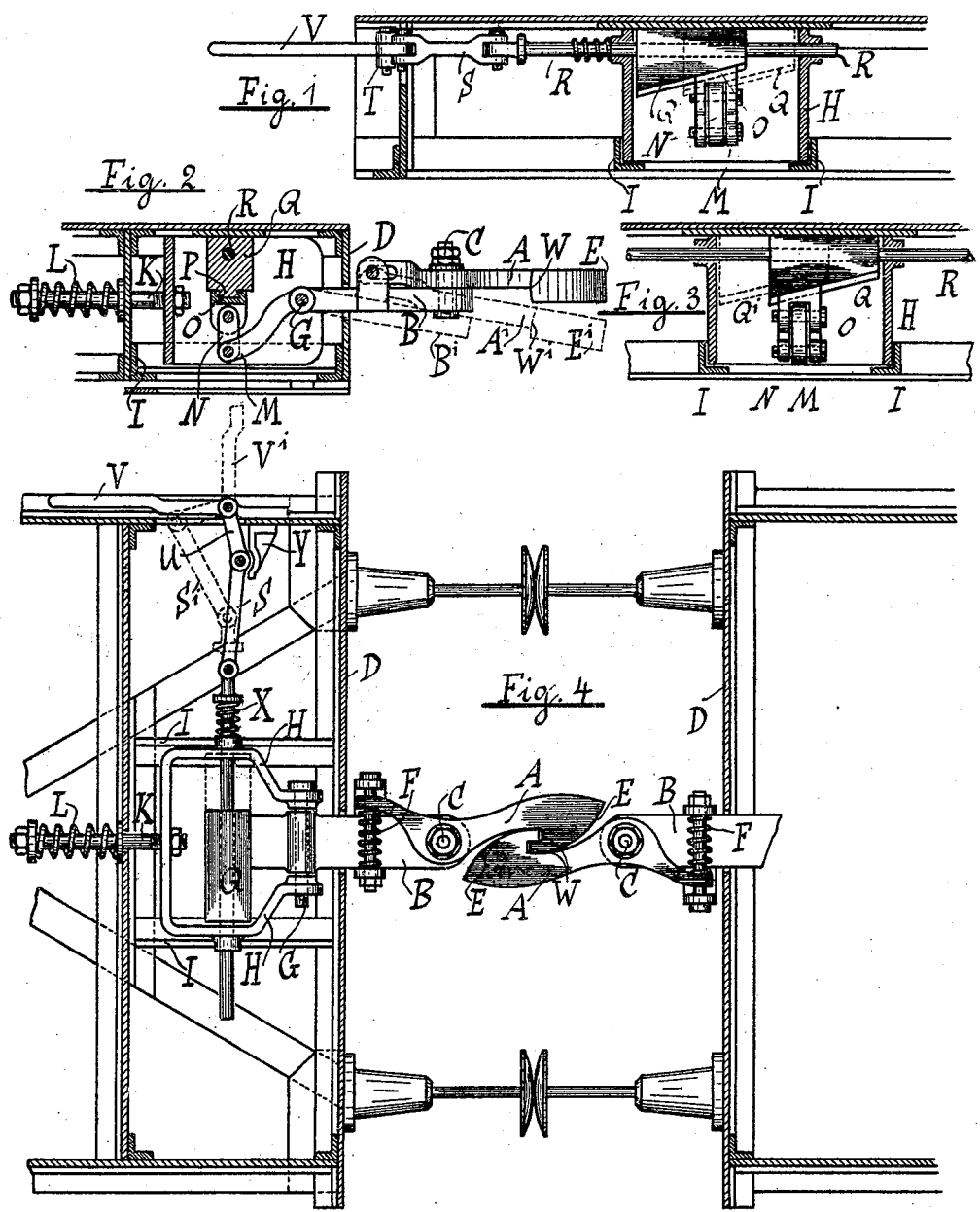

SIEGMUND FRAENKEL AND JOHANN KONRAD HELD, OF FUERTH, GERMANY.

AUTOMATIC COUPLING FOR RAILWAY-VEHICLES.

SPECIFICATION forming part of Letters Patent No. 642,598, dated February 6, 1900.

Application filed August 8, 1899. Serial No. 726,540. (No model.)

*To all whom it may concern:*

Be it known that we, SIEGMUND FRAENKEL and JOHANN KONRAD HELD, subjects of the Emperor of Germany, and residents of Fuerth, Kingdom of Bavaria, Germany, have made certain new and useful Improvements in Automatic Couplings for Railway-Vehicles, of which the following is a specification.

A number of couplings for railway carriages and vehicles have been invented the working of which was based on the fact that two adjacent vehicles are kept together by coupling-heads attached to the frames of same and engaging with one another by various means. For maintaining the connecting position of such coupling of two vehicles elastic catches, pawls, or other locking devices have generally been employed, such couplings being caused to engage with each other when the carriages were pushed together; but such couplings had to be actuated by suitable devices to disengage them from each other when it became necessary to uncouple the carriages, such devices usually requiring the presence of an attendant between the vehicles. As a contrast to these now well-known couplings and to obviate the necessity of such attendant endangering his life by so entering between the vehicles our invention discloses an easy and simple method of disengaging such couplings and at the same time dispensing with such catches or the like, this object being attained by the feature that each of the two couplings according to this invention is constructed in such a manner that it is capable of rotating around two axles, one placed at right angles to the other, while the mutual displacement of the coupling-heads, which first takes place, and the subsequent mutual engagement of the two heads in assuming the coupling position are performed by causing the heads to partially rotate around the vertical axle, while the disengaging of the two coupling-heads is attained by causing either of them to partially rotate around the horizontal axle, during which latter operation the tooth-like contact-surfaces of the two heads slide over one another, and thus become disengaged.

The most approved method of constructing and arranging our said invention is illustrated in the accompanying drawings, of which—

Figure 1 is a section upon the line A B of the partly-sectional plan view Fig. 4, Fig. 2 being a section upon the line C D of the same figure. Fig. 3 is a section like Fig. 1, but showing the second position of the uncoupling-wedge, hereinafter explained.

There are two coupling-heads A A, each being shaped in the form of a claw (see Figs. 2 and 4) and are each arranged at the end of a draw-bar B upon each vehicle D in such a manner that they are each capable of partially rotating around their respective vertical axles C C, and when the carriages D D are pushed together the graduated contact-surfaces E E of the said coupling-heads slide upon each other by turning around upon the said vertical axles C C, simultaneously compressing the springs F F until they finally assume the locking position shown in Fig. 4.

Each draw-bar B is capable of rotating around a horizontal axle G, placed in bearings in a frame H, this latter finding a longitudinal guidance in horizontally-arranged rails I and suspended upon the frame of the carriage at J by means of a bolt K and a suitable spring, such as L, the tension which the coupling is to resist while the train is in motion being therefore taken up by the frame H and the spring L, which elastically transmits such tension to the carriages D D.

For disengaging the coupling-heads A A from each other they are so arranged that either may partially rotate, with its draw-bar B, around its horizontal axle G into the position A' B' (shown by dotted outlines in Fig. 2) by turning it downward. In order to render such a turning possible, the following arrangement may be considered as an example:

The inner end M of each draw-bar B is connected to a guiding-piece O by means of a link N, (see Figs. 1 and 2,) and a wedge Q is made capable of moving along the inclined surface of the piece O in a dovetailed groove or recess P. The said wedge Q can be adjusted by means of the bar or shaft R, which is horizontally borne on the frame H, the said bar or shaft R being connected by means of a link S with one end of a lever V, which is mounted upon an axle T. If, therefore, either of the cranks or hand-levers V, placed at the side of each carriage D and fixed upon the axle T, is moved in the direction of the arrow into the position V' (marked by dotted lines in Fig. 4) the wedge Q of the carriage so operated upon would be caused to take the position shown by Q', which is shown in full lines in Fig. 1 and in dotted outline in Fig. 3, whereby the inclined surfaces of Q and O would slide upon each other along the dovetailed groove P in O. By reason of this movement the said piece O, and therefore, also, the inner end M of the draw-bar B, is caused to rise in such a manner that the latter and the coupling-head A take the position B' A', which is shown in dotted lines in Fig. 2.

The claw or tooth like contact-surfaces W, Fig. 4, of both the coupling-heads A A, which had previously engaged in one another, are now caused to separate, to facilitate which the said surfaces are provided with sloping or curved edges W'. (See Fig. 2.)

In order to bring back the coupling-head A into its original position, it is only necessary to turn back the crank or hand lever V' into its former position V, whereby the wedge Q is pushed back again and the coupling-head A therefore caused to rise, and in effecting this the lever V, (see Fig. 4,) having passed its dead-point, the same is caused to press against the projecting or abutment piece Y, Fig. 4, of the carriage-frame by the tension of a spring X, mounted upon the bar or shaft R, so that the whole uncoupling arrangement falls into this position and is maintained in the same when the hand-lever is turned back ready for recoupling again with the same or another carriage.

Instead of causing the rotation of the coupling-head around its horizontal axle G, as a result of the adjustment of the wedge O in P, this movement of rotation may of course also be produced by other transmitting devices, such as suitably-arranged screw-shafts, bracket-levers, or the like.

Having now particularly described and ascertained the nature of our said invention and in what manner the same is to be performed, we declare that what we claim is—

1. In a car-coupling, a draw-bar pivoted upon a horizontal axis and having its rear end extended to the rear of said axis, a coupling-hook pivoted to the forward end of said draw-bar upon a vertical axis, a wedge-block moving transversely above the rear end of said draw-bar and adapted to depress the same, and means for reciprocating said wedge-block, substantially as described.

2. In a car-coupling, a draw-bar pivoted upon a horizontal axis and having its rear end extended to the rear of said axis, a coupling-hook pivoted to the forward end of said draw-bar upon a vertical axis, a wedge-block moving transversely above the rear end of said draw-bar and adapted to depress the same, a lever at the side of the car connected to said block, and a spring exerting pressure to hold said block normally pressed in one direction, substantially as described.

3. In a car-coupling, a draw-bar pivoted upon a horizontal axis and having its rear end extended to the rear of said axis, a coupling-hook pivoted to the forward end of said draw-bar upon a vertical axis, a wedge-block moving transversely above the rear end of said draw-bar and adapted to depress the same, a wedge-block arranged to slide transversely above the rear end of said draw-bar, a guide-piece having a sliding connection with said wedge-block, a link connecting said guide-piece with the rear end of the draw-bar, and means for operating said slide-block, substantially as described.

In witness whereof we have hereunto set our hands in presence of two witnesses.

SIEGMUND FRAENKEL.
JOHANN KONRAD HELD.

Witnesses:
 ANDREAS SLICY,
 OSCAR BOCK.